(12) United States Patent
Kalisiak

(10) Patent No.: US 8,060,004 B2
(45) Date of Patent: Nov. 15, 2011

(54) METHOD OF DISTANCE LEARNING

(75) Inventor: Jerzy Kalisiak, Warsaw (PL)

(73) Assignee: Anna Kalisiak-Ward (PL)

( * ) Notice: Subject to any disclaimer, the term of this patent is extended or adjusted under 35 U.S.C. 154(b) by 1350 days.

(21) Appl. No.: 10/525,265

(22) PCT Filed: Oct. 29, 2002

(86) PCT No.: PCT/PL02/00079
§ 371 (c)(1),
(2), (4) Date: Feb. 22, 2005

(87) PCT Pub. No.: WO2004/021308
PCT Pub. Date: Mar. 11, 2004

(65) Prior Publication Data
US 2006/0115803 A1    Jun. 1, 2006

(30) Foreign Application Priority Data
Aug. 29, 2002  (PL) .......................... 355770

(51) Int. Cl.
*G09B 3/00* (2006.01)
*G09B 7/00* (2006.01)

(52) U.S. Cl. .......................... 434/350; 434/322; 434/323

(58) Field of Classification Search .................. 434/322, 434/323, 350
See application file for complete search history.

(56) References Cited

U.S. PATENT DOCUMENTS

| | | | |
|---|---|---|---|
| 5,310,349 A * | 5/1994 | Daniels et al. ................ | 434/350 |
| 5,700,149 A | 12/1997 | Johnson, III et al. | |
| 5,772,446 A | 6/1998 | Rosen | |
| 5,833,468 A * | 11/1998 | Guy et al. ..................... | 434/350 |
| 5,836,771 A | 11/1998 | Ho et al. | |
| 5,879,165 A | 3/1999 | Brunkow et al. | |
| 5,890,911 A | 4/1999 | Griswold et al. | |
| 5,934,910 A | 8/1999 | Ho et al. | |
| 5,944,530 A | 8/1999 | Ho et al. | |
| 6,024,577 A | 2/2000 | Wadahama et al. | |
| 6,039,575 A | 3/2000 | L'Allier et al. | |
| 6,086,381 A | 7/2000 | Downs et al. | |
| 6,091,930 A * | 7/2000 | Mortimer et al. ............. | 434/362 |
| 6,118,973 A | 9/2000 | Ho et al. | |
| 6,155,840 A * | 12/2000 | Sallette ........................ | 434/323 |

(Continued)

FOREIGN PATENT DOCUMENTS

GB    2 334 119 A    8/1999

(Continued)

*Primary Examiner* — Xuan Thai
*Assistant Examiner* — Jerry-Daryl Fletcher
(74) *Attorney, Agent, or Firm* — Brinks Hofer Gilson & Lione

(57) ABSTRACT

The distance learning system and method provide distance learning efficiently and effectively. The distance learning system (DLS) includes an education program, and an education center server of an educational platform for database management, data transfers and communications amongst the education system users. The DLS divides the education program into several education levels, and students register and receive an electronic data carrier in the form of CD or DVD disk containing educational material for the subject studied. The DLS establishes an interactive on-line session of electronic workshops and the students, who do not login to the educational platform before the start of the electronic workshops are directed into a "waiting room" and later included in the electronic workshops, preferably prior to the commencement of a next part of the workshops. The "waiting room" for delayed students may be created by parallel, shifted in time running of several similar electronic workshops.

19 Claims, 4 Drawing Sheets

U.S. PATENT DOCUMENTS

| | | |
|---|---|---|
| 6,212,358 B1 | 4/2001 | Ho et al. |
| 6,311,041 B1 * | 10/2001 | Goodyear .................... 434/350 |
| 6,315,572 B1 | 11/2001 | Owens et al. |
| 6,336,813 B1 | 1/2002 | Siefert |
| 6,341,960 B1 * | 1/2002 | Frasson et al. ................ 434/322 |
| 6,347,333 B2 * | 2/2002 | Eisendrath et al. ........... 709/217 |
| 6,381,444 B1 * | 4/2002 | Aggarwal et al. ............. 434/350 |
| 6,384,893 B1 * | 5/2002 | Mercs et al. .................. 352/133 |
| 6,397,036 B1 * | 5/2002 | Thean et al. .................. 434/350 |
| 6,845,361 B1 * | 1/2005 | Dowling .......................... 705/5 |
| 7,210,938 B2 | 5/2007 | Packard |
| 7,237,189 B2 | 6/2007 | Altenhofen et al. |
| 7,299,067 B2 | 11/2007 | Riggs |
| 2001/0018178 A1 | 8/2001 | Siefert |
| 2001/0034015 A1 * | 10/2001 | Raichur et al. ................ 434/322 |
| 2001/0034016 A1 * | 10/2001 | Ziv-el et al. ................... 434/350 |
| 2001/0039002 A1 | 11/2001 | Delehanty |
| 2001/0044099 A1 | 11/2001 | Rappaport |
| 2001/0051330 A1 | 12/2001 | Futakuchi |
| 2002/0018984 A1 | 2/2002 | Ho et al. |
| 2002/0045155 A1 | 4/2002 | Sugimoto |
| 2002/0187462 A1 * | 12/2002 | Mariappan .................... 434/350 |
| 2003/0054328 A1 * | 3/2003 | Stuppy et al. ................. 434/350 |
| 2003/0180700 A1 * | 9/2003 | Barry et al. ................... 434/350 |

FOREIGN PATENT DOCUMENTS

| | | |
|---|---|---|
| GB | 2 347 260 A | 8/2000 |
| GB | 2 368 710 A | 5/2002 |
| WO | WO 96/21212 | 7/1996 |
| WO | WO 99/24953 | 5/1999 |
| WO | WO 99/46747 | 9/1999 |
| WO | WO 99/54857 | 10/1999 |
| WO | WO 00/70583 | 11/2000 |
| WO | WO 01/80202 A2 | 10/2001 |
| WO | WO 01/82150 A2 | 11/2001 |
| WO | WO 02/09065 A2 | 1/2002 |
| WO | WO 02/11103 A1 | 2/2002 |
| WO | WO 02/15050 A1 | 2/2002 |
| WO | WO 02/17275 A2 | 2/2002 |

* cited by examiner

METHOD OF DISTANCE LEARNING

FIELD OF THE INVENTION

The present invention relates generally, to a method of distance learning. More particularly, the present invention relates to a method of distance learning comprising the steps of: installation on at least one education center server of a software for database management, data transfer and communication amongst the education system users; student registration in the scope of which they receive at least one electronic data carrier containing educational material for the subject studied in a given format; establishing at least one interactive on-line session between a lecturer and the students, during which session the lecturer presents educational material to the students' interface, in particular by means of activating the material contained in the students' electronic data carriers, and asks the students questions and/or transfers tests and/or exercises to solve, wherein the students' interface is comprised of windows and tools, including those of remote communication, such as electronic mail, voice mail, chat and forums; and finishing the on-line session within a predetermined period of time.

BACKGROUND OF THE INVENTION

Economic changes and technologic progress of any country results in the necessity to acquire, in accordance with current needs, new abilities, usually obtained by university studies. Traditional education requires students to travel to an education center, often distant from their homes, frequent commuting and organizing of time for participation in day-time, evening or week-end classes, can significantly increase the cost of study for some and limit the time available to study for others. As a result, many segments of the population, desirous to improve their qualifications, particularly those working, raising children, physically handicapped or with limited financial means have little opportunity to follow a traditionally conducted education.

The progress and development of informatics has provided unlimited possibilities of application for distance education, resolving the above problems, and making education available for a considerably larger segment of the population. New computer technologies provide quick access to extensive data sources and databases (Internet), new communication means (e-mail, chat, voice mail, videoconferencing) and work tools, including better and constantly improved software and hardware.

These advantageous properties offered by new technologies have resulted in the very fast development of new remote learning methods and an enormous increase the growth of the number of on-line students. In tracing the requirements for distance education using technology, a number of systems and methods for teaching, utilizing electronic means of data processing, transfer and communication, have been proposed.

U.S. Patent Application No US 2001/051330 A1 by Futakuchi, describes an apparatus and a method for providing remote teaching. The apparatus is comprised of a question database, an answer database and a comment database as well as a control unit, connected via the Internet to the students' personal computers. The system determines, whether the answer to a given question is right and generates an appropriate comment.

U.S. Patent Application No US 2002/0018984 by Ho et al. relates to a method and a system of learning based on questions and answers. After working on the study materials presented by the system, the user introduces a question into the system, which generates and presents an answer. Then the system compares the questions with those previously entered, to determine his level of understanding of the subject and to select appropriate study materials.

U.S. Pat. No. 6,139,330 to Ho et al. describes a computer-aided learning method and system based on tests. The system is provided with a recommendation generator which may have a form of a software, hardware or some combination of both. The generator is configured to assess user's understanding of the subject.

U.S. Patent Application No. US 2001/0039002 to Delehanty, describes a system and a method for implementing and managing training programs over a network of computers. The system comprises computers of the server-client type, while the server contains a user database, an actionable database and reference database. The system and method enable training by means of the Internet and a web browser. When a user follows the training, the system monitors the student's results and enables the web administrator to determine in real time the student's progress and add additional materials of study if a need for supplementary education is perceived. During the training, the administrator may communicate with the user directly.

U.S. Pat. No. 6,164,974 by Carlile et al. relates to a learning system to be used by authors, teachers, students and education administrators. Within this system, a student, while studying a displayed subject matter, may check the degree of their knowledge using tests that are provided and the results of those tests are displayed together with an assessment of the student's knowledge of the subject matter.

U.S. Pat. No. 6,326,632 by Chao et al. relates to a computer-aided learning method, allowing a student to select an appropriate instructor for learning a language and vice versa. After the student's choice of instructor has been made, establishing a connection between them occurs and then automatic management and payment collection for the session.

U.S. Pat. No. 6,341,960 to Frasson et al. describes a method of providing a learner with information, during a session of automatic distance learning using the Internet. The method comprises an automatic selection of learning strategy, determination of a need to use help data, being a separate part of educative information, and their selective presentation. When using a model of an automatic learner, possible difficulties are revealed, then, on this basis, explanations from a local database or the web are provided.

PCT/IT01/00336 (WO 02/09065) by Valenti relates to a computer-implemented didactic method, which is comprised of the following steps: a user connecting to a central management system; downloading from the central management system the program-environment to their computer (if not already available); checking the student's registration in the system (if there is none, it is started); the user obtaining data files containing educational material for subjects to be studied and possible extension programs; creating for each user a personal download area; disconnecting the user from the system; and activation of the data files for realizing a training session.

U.S. Pat. No. 6,336,813 by Siefert and U.S. Pat. No. 6,386,883 by Siefert and U.S. Patent Application No. US 2001/0018178 by Siefert describe a computer-assisted education method, in which individual learning profiles for every student are maintained, including their capabilities, preferred learning style, and progress. Based on the student's profile, the system's administrator selects an appropriate material for each student, during each learning session. Then the administrator assesses if the student has mastered the material. If not, a presentation of the material explained differently follows and in the case of a student continuing to fail to master the material, the administrator establishes a videoconference between the student and a lecturer. Learning programs and education material are contained in master computers, accessible via a communication network. The invention is applicable for known education programs and known management systems.

Computer-based, interactive learning method and system, permitting application of various teaching techniques, adapted to individual abilities and needs of the students is disclosed in PCT/US00/32960 (WO 01/43107) to Koneru et al. The system includes students' computers, teachers' computers and a remote server, containing several databases consisting of exams, tests and vocabulary, detailed student information and their individual learning schedule and teaching profile, as well as information of the teachers, interconnected by a web. For each student is created an individual homepage with a graphic interface, containing among other things questions, tests, exams, study subjects and helpful tools. Electronic mail, fax and voicemail remain at a disposal of the system's users.

UK Patent No. 2 368 710 to Dugdale at al. discloses computer-readable CD-ROM disc media, containing data grouped in sections and at least one URL address for communication with an active server page, which contains a database of external links corresponding to specific keywords within a given section.

U.S. Pat. No. 6,190,178 relates to a remote education method and apparatus. Students connect via the Internet with an education server, which contains an educational program, including individual progress data for each student. The remote education method is comprised of a student selecting required learning procedures in an Internet homepage of the education server, consequently finding data related to the procedure selected and then creating an educational homepage, with the assistance of which the student implements his study. Upon completion of the study, the student answers tests, which are then analyzed by the server and upon analysis of the results a direction for continuing study is indicated.

PCT/US01/42230 (WO 02/25619) by Crilly describes a method of adaptation of educational standards in different states and regions, comprising the steps of providing each class with a computer and DVD disks containing educational aids in the form of video and audio, connecting the computer with a World Wide Web, from which are taken additional educational aids, lesson plans and projects, being relevant to the particular operating location, and presenting the educational material, together with that contained in DVD disk, to the students in a classroom.

U.S. Pat. No. 6,195,528 by Young et al. describe a remote teaching method and system. Each student is provided with a CD-ROM disk, containing an educational material in various formats and a software, with the aid of which, the student's computer may connect with a central computer to download appropriate data, particularly those updated in relation to the data contained in the student's CD-ROM disk.

Interactive method for distance education using a computer network is disclosed in U.S. Pat. No. 6,381,444 to Aggarwal et al. The method comprises the steps of student registration to a chosen virtual class on a main server, downloading from this server of an educational material by an instructor and sending it before starting the lesson to all students of a given class. After start of the lesson, the instructor controls, on the server level, the students' computers where the educational material is presented. The student interface contains windows, where various information is displayed, including the material presented, video pictures, e.g. that of a real classroom, as well as students' questions to the instructor and his answers.

U.S. Pat. No. 6,155,840 by Sallette relates to a system and method for distributed learning by means of computer systems and a communication network such as Internet. The system includes a server with which are connected a presenter, presenting an educational material, and the users' computers, coupled to the server via Internet. The presenter's interface includes a few windows and tools intended to configurate the presentation. Individual windows are provided for a list of information sources for the presentation, like films, homepages or slides, for an information about material presented and about the presenter, a window for communication with students, e.g. by means of chat, as well as two windows for presenting two streams of educational material of which one serves for video-presentation. Users' interfaces include similar windows.

Another method of on-line education in the frame of an open virtual university is disclosed in PCT/US01/40102 (WO 01/61670) to Wheeler. The educational system is created by various universities and schools, sponsors, students and an interconnected intermediary, being for instance a virtual medical school, an Internet provider or a governmental agency. A program of the studies includes lectures on various subjects, which are presented to the students by several institutions by means of the intermediary and the Internet. Sponsors, for instance a pharmaceutical firm or a health organization, cover at least partially the costs of the system's implementation, which reduces the students' education costs. Studies maybe divided in two stages, of which one includes the on-line education and the second stage is conducted on campus upon satisfying completion of the first stage.

Yet another system and method of on-line education is disclosed in PCT/US00/17979 (WO 01/01372) to Alcorn. The system includes a server, connecting students' and instructors' computers via a network. The server contains course files, accessible for registered users in accordance with their authorized access level. Course files include announcement and information files, documents, exercise files and communication files. On-line education comprises the steps of generating by the course instructor of a set of course files, transferring the files to a server for storage, and making access to the files to a group of students being registered for that particular course. During the course, the instructor selects, from a batch of available files, appropriate exercise files or creates such files and adds them to those existing, and transfers these to the students for resolving. Upon resolution of the exercises, the students create answer files, transfer them to the instructor which evaluates them and presents to the students a list of ratings. The instructor has at his disposal several tools, such as those for creating the course, for the presentation of educational material in an appropriate format, a list of Internet links, chat, electronic mail and similar tools, permitting him to conduct the course by various techniques.

UK Patent No. GB 2 334 119 A by Young et al. refers to a teaching method and system, in which are used CD-ROM-s with educational material and software for managing educational material, communicating with another computer to obtain access to other parts of the educational material as well as for downloading material updates and tests.

The systems and methods of remote education, described above most often relate to a fully automated teaching to obtain or improve a knowledge upon a given subject, hence to a fragmentary education. They are adapted to a fast and easy means of gaining knowledge, with the assistance of computers and communication networks, with lack or considerable limitation for the participation of highly qualified persons, e.g. a university lecturer. Although a majority of known remote education systems and methods have several advantages, it is not possible to apply them directly for teaching students in accordance with high level traditional education programs. For this purpose it is necessary to develop a coherent education system including the whole program of the studies, which should be the same as in the case of traditional studies and should ensure a high level of education, with frequent contacts between the students and the lecturers. Thanks to this, it will be possible for the students to gain the same knowledge and qualifications as in traditional studies.

SUMMARY OF THE INVENTION

In accordance with the invention there is provided a method of distance learning, the method comprising the steps of:

a) dividing the education program into several education levels, of which each one including at least one module, corresponds in its contents to a subject of a traditional education;

b) providing each student, within the registration, with at least one electronic data carrier including workshop material and a multi-media electronic textbook for independent study, and with an access password to the educational platform;

c) establishing at least one interactive on-line session of electronic workshops for each module within each education level in a predetermined time after registration of the students, at least one interactive session being established through the educational platform containing a web site, and at least one interactive session including a presentation to the students by the lecturer of the workshop material, submitting to them questions and exercises to resolve, checking and discussion of the exercises' solutions by the lecturer and a group discussion among students, with use of remote communication means;

d) activating electronic consultations between the students and the lecturers, following the termination of each interactive session of the electronic workshops, with use of remote communication means;

e) providing each student, following the termination of a predetermined session, preferably the first session of the electronic workshops, with a subject of a test work for individual preparation and to be submitted using a test work report to the university at a predetermined time; and f) conducting a final examination for each module.

In a preferred embodiment, each educational level includes at least several modules. For each module are organized several, preferably between 5 and 10, interactive sessions of the electronic workshops, of which each has a duration between 1 and 5 hours, preferably between 2 and 3 hours.

Preferably, the workshop material, being activated during the interactive electronic workshops, consists of a series of following sequences: presentation of problems, description, explanation, illustration, actual example from an economic reality, indication of application possibilities, checking of the students' understanding of the material and finally a recommendation for individual application.

In a most preferred embodiment of the invention, the method further comprises the step of dividing each session of the electronic workshops into several independent parts with the same or different duration, wherein in the first part a presentation to the students of the workshop material, a discussion of the issues by the lecturer, as well as students' replies to the lecturer's questions take place; in the second part—transmitting by the lecturer of exercises for individual resolution and their resolving by the students; in the third part—checking of the exercise solutions by the lecturer and a discussion between the students by means of remote communication means; in the fourth part—summing-up of the issues and exercise solutions by the lecturer; and in the fifth part—a discussion between the students by means of remote communication.

Advantageously, the method further comprises the step of directing the students, who do not manage to login to the educational platform before the start of the electronic workshops, first into a "waiting room" and then automatically including them into the participation in the electronic workshops, preferably prior the commencement of a next part the workshops. The "waiting room" for students is advantageously created by parallel, shifted in time, running of a few identical electronic workshops, advantageously during the first part of the workshops.

During the presentation of successive issues by the lecturer, the students are preferably provided with a list for saving Internet addresses relating to the issue discussed, to which new addresses are then attached to the list relating to consecutive issues.

Advantageously, for a discussion are utilized remote communication means in form of at least one tool selected from a group consisting of: electronic mail, voice mail, discussion group, chat and forum.

In a preferred implementation of the invention, the electronic consultations are conducted by means of the educational platform, with use of the e-mail and discussion group that consist of the students of a given module, and with participation of an operator/consultant and/or the university's lecturers. Upon receipt of a question by an operator/consultant within the electronic consultations, a check is first made in a "knowledge database" and if it does contain an answer to the question asked, the operator/consultant transmits it to the student, while in the case of a lack of such an answer, the question is directed to a lecturer running a given module, which transmits the answer to the operator/consultant and the latter to the student. The answer to a question asked is advantageously added to the knowledge database. Preferably, a lecturer is the operator/consultant of the electronic consultations.

Preferably, the method further comprises the step of activating interactive archives of electronic workshops, the archive of workshops being activated after the termination of the electronic workshops, but prior to returning the test work report, preferably solely to the scope of the first part of the electronic workshops.

In a most preferred embodiment of the invention, the method further comprises a step of activating interactive electronic reviews, the reviews being activated prior to the final examination for each module, with a participation of the lecturer. The reviews comprise, among other things, a review of the material covered within the electronic workshops and a group discussion, with use of remote communication means.

The electronic reviews are conducted most advantageously similarly to the electronic workshops.

In a particularly preferred embodiment of the invention, the method further comprises the step of creating, prior to commencing the examination, a dynamic examination list, which is blocked in a predetermined time before the start of the examination. The examination is conducted by a traditional means or by an electronic means.

It is preferred that all the information, terms and possibly duration of individual components of the educational process, i.e. the interactive electronic workshops, the archived workshops, the test works, the electronic reviews and the examination, as well as control work subjects and results, and the exam grading, preferably together with general remarks and descriptions, are included in the web site of the educational platform, which is accessible through the use of the access password and the student's identification number.

In a preferred embodiment, the method further comprises the step of creating a dynamic electronic library in the web site of the educational platform, the library being accessible through the use of the access password and the student's identification number.

If desired, the method further comprises the step of checking, prior to the commencement of an electronic workshop session, of a computer's equipment and software, necessary for the communication with the educational platform and being in the possession of the students. The checking being made by means of test software included in the educational platform's web site. In the case of finding by the test software of a deficiency of necessary software, an automatic installation of such software through the educational platform's web site follows.

In a particularly preferred embodiment of the invention, the workshop material and the multi-media electronic textbook provided to the students are included in a single CD-ROM disk.

In the frame of registration, the students are preferably provided for each module with a syllabus contained in an electronic data carrier, preferably in the CD-ROM disk including the workshop material and the multi-media textbook. In this CD-ROM disk is also placed a starter package, including in particular a didactic guide and a technical instruction as well as a software necessary to open the formats of the files contained in the workshop material and the electronic textbook.

During the interactive electronic workshops and the electronic reviews for the students is displayed an interface, including at least two, preferably three main windows: an information window, an action window and a dialogue window, respectively, and tool bars.

In a preferred embodiment of the invention, in the information window is presented all complementary information relating to the material discussed, in the action window is presented an educational material concerning the issues discussed by the lecturer, and in the dialogue window are displayed in particular the syllabus, an index of key notions, definitions and formulas, a calculator, the electronic textbook as well as the chat and the e-mail.

It is preferred, that in the action window are presented videos, 3-D animations, 2-D illustrations, layouts, diagrams, texts, calculations and other dynamic information. The videos in the action window may include at least one presentation selected from the group consisting of: video with a lecturer or other individual discussing an issue, recorded earlier or taken by a camera in real-time, video with an example illustrating an issue, interviews, documentary films as well as video showing utilization of computer programs, in particular of calculation sheets and databases.

Toolbars in the interface comprise advantageously communication buttons, including those for the chat, the e-mail and the forum, and recall buttons, including recalls to the electronic textbook, to the glossary of terms, the syllabus, Internet addresses and to the calculator. Preferably, in various phases of the electronic workshops individual communication and recall buttons are enabled or disabled.

The system of distance education according to the invention is elastic and fully synchronized with a traditional education, since it enables the individual to shape and select a suitable mode of study, with an implementation of certain educational stages by an electronic or traditional means.

The system enables studying to individuals from any region within and outside the country, without a requirement of frequent travel to the university which has an extreme importance for handicapped persons, for persons having extensive professional or family obligations and for the impoverished. The system of education according to the invention has a considerable social importance, since it offers the opportunity to obtain an education to a much larger group of persons than in the case of traditional education.

Organization, coherence and absolute modularity of the education system ensure high standards of teaching on various study levels. Within the system are applied available remote communication means, several ways of knowledge transfer, adapted to individual needs of the students as well as direct or virtual contact with a lecturer, which makes of the education according to the invention, an active one.

BRIEF DESCRIPTION OF THE DRAWINGS

In order to understand the invention and to see how it may be carried out in practice, a preferred embodiment will now be described, by way of a non-limiting example only, with reference to the accompanying drawings, in which.

DETAILED DESCRIPTION OF PREFERRED EMBODIMENTS

The system of distance education, according to the invention, covering both the learning method as an apparatus for its implementation is intended particularly for education of the university students with possibility of selecting various programs, such as for example Business Management, Business Information Management, Finance Administration, Business Finance and Information Systems, Advertising and Marketing, Enterprise and Management or any other program, depending on the university's profile. These may be both full academic programs and short education forms (after diploma studies, education/courses). Although the invention is described below in relation to universities, it will be understood for those ordinary skills in the art that the method of the present invention can be carried out for any schools, training and development centers on various levels.

Figure 1:
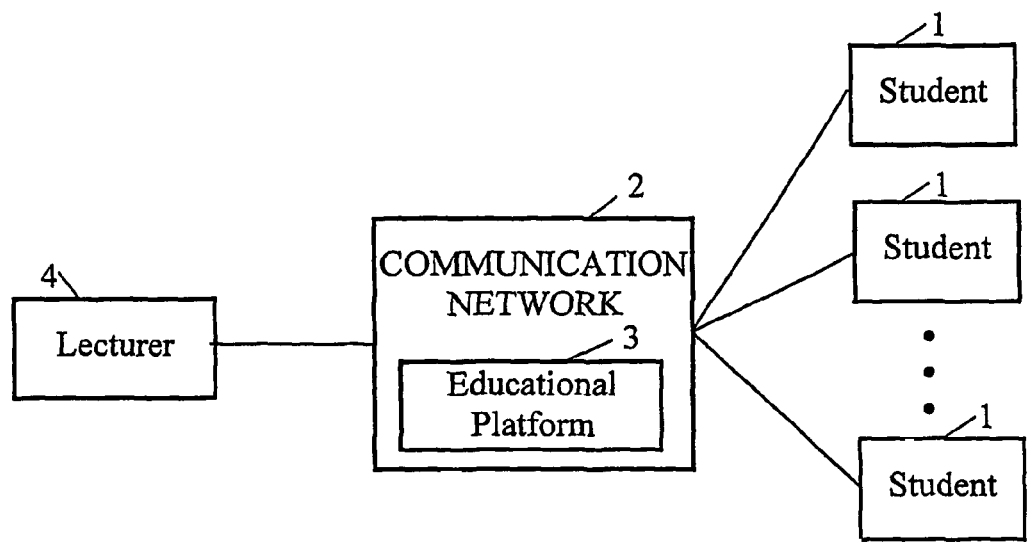
FIG. 1 illustrates a block diagram of the distance learning system.

The studies take place at a distance with utilization of electronic data processing and transfer as well as of remote communication means. General block diagram of the education system is shown in the FIG. 1. Each student 1 is provided with a computer, not shown in the drawing, such as for example a PC unit including an appropriate processor (such as Pentium II) a drive for disks, such as CD-ROM and/or DVD and/or floppy disks, an adequate RAM memory (e.g. 64 MB), graphic and sound cards, a modem or a net card (enabling a data transfer at minimum 5 kbyte/s speed) as well as standard peripheries, such as a monitor, a keyboard, a mouse, earphones/loudspeakers and possibly a printer. The computer should have an appropriate operating system, advantageously of a Windows or a Linux type and other basic software such as a text editor, a calculation sheet and a video player.

The computer of each student 1 may be connected via a communication network 2, such as Internet, to the educational platform 3 implemented in at least one local net (LAN) of the university's education center, directly accessible for lecturers 4. If the university has several divisions, then the educational platform 3 may be implemented in all equivalent sub-nets of the divisions, which will reduce the sub-nets load and decrease the system's mortality.

As used herein, the term "student" is intended to mean any person studying at any university, including technical ones, at any school, training or vocational development center. As used herein, the term "lecturer" is intended to mean any individual conducting lessons with students, for example a professor, an assistant lecturer, a teacher or an instructor.

The educational platform 3, which is called "e-edusystems", consists of a software, destined for conducting on-line lessons, utilizing a transmission of data in any format for communication among the system's users and to gain access to various educational resources of the school.

Figure 2:
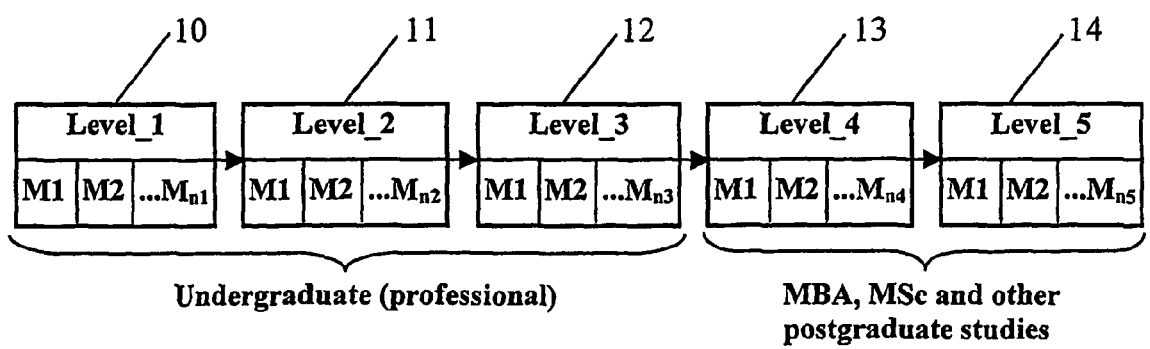
FIG. 2 shows a block diagram of modular distance learning method.

The learning system according to the invention is destined for a distance education of students in a mode called "e-learning" and enables performing studies on various levels, similarly as in the case of traditional full-time or evening studies. A scheme of multilevel studies is illustrated in the FIG. 2. The studies may be finished partially with a diploma for completing first and second study levels (Level_1 and Level_2, respectively) as well as for a Bachelor of Arts (BA) degree (Level_3) after accomplishing all the modules (subjects) on all three study levels (undergraduate studies). Upon completing Level_4 and Level_5 (so called postgraduate studies) the student achieves a Master of Arts, Master of Sciences or Master of Business Administration diploma. The number of education levels 10, 11, 12, 13 and 14 is not limited to five and may be smaller or greater, depending on the specifics of the school and study profile.

The learning method according to the invention is based totally upon a modular system of education. Each level 10, 11, 12, 13, 14 of the studies includes several, for example eight educational modules $M_1, M_2, \ldots M_n$, every one of which is an analogy to one traditional subject in its program and contents. The program of educational modules $M_1, M_2, \ldots M_n$ ensures obtaining the same knowledge as during traditional full-time studies, thanks to which all the students, whether studying in full-time, evening or distance mode, are entering together the same examination and obtain the same diplomas. All the students are also obliged to complete a diploma seminar and to defend a thesis.

Selection of modules for a study, during a given session, depends to a large extent on the student, his time, financial and intellectual capabilities. A student has to select for one session at least one module. Generally, the number of modules studied may be discretional but a number higher than two or three is not recommended. More modules studied during one session permit an earlier completion of the studies, but may hinder the student's assimilation of the knowledge. Also the sequential order of modules studied is relatively unrestricted. Limitations relate solely to those modules, which may be selected only after completing an earlier one. This way, each student may, on their own, considerably modify his learning process, depending on various circumstances.

An academic year of the studies according to the invention has a duration of 10 (or 12) months, starting 4 (or 5) times a year (depending on student's choice) that is, for example on the 1 of September, 1 of November, 1 of February and 1 of April (or also on the 1 of July). The academic year consists of a few (4 or 5) two-month sessions of seminars-workshops, during which a selected module (or modules) is implemented, according to a chosen schedule and of two (or more) monthly examination sessions (for example in January and June).

Activity schedules for individual modules are placed in the university's web site, and students have a choice from a few terms for the activities to make a selection according to their professional, time or other preferences.

Figure 3:
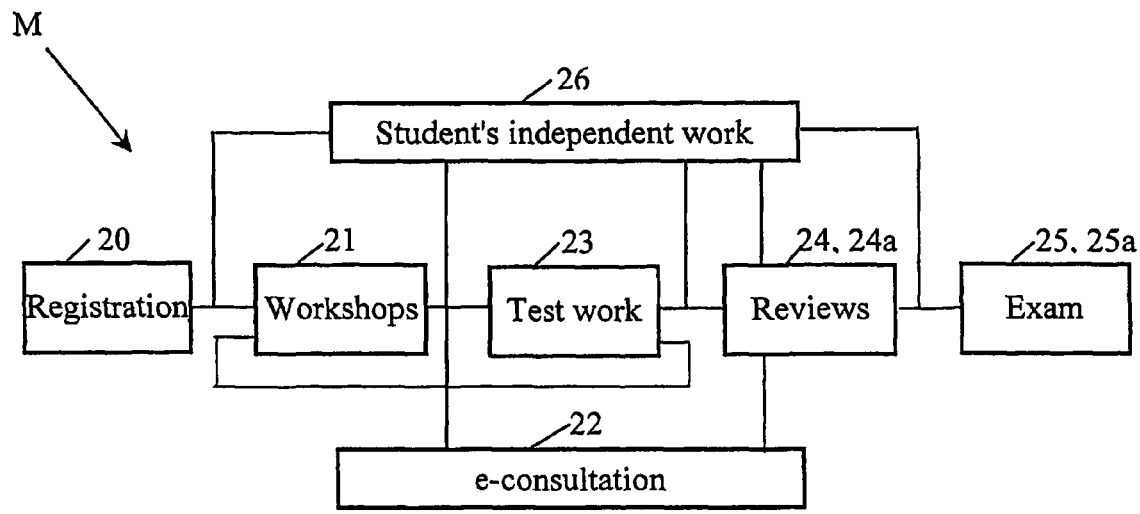
FIG. 3 presents a block diagram illustrating the modular distance learning method within a single module.

An important feature of the present invention is in its total synchronization with a traditional education system, and individual steps of the method may be implemented as well by fully electronic means, as by partly traditional, for example during the registration, submitting the control work or participation in the consultations. All the students, regardless of the selected mode of studies, are subject to the same crediting and examination requirements. The exams take place in the same time at a determined place and each student has to participate in them personally. FIG. 3 represents a method of distance learning according to the invention within one exemplary module M. Identically occurs studying of other modules: $M_1, M_2, \ldots M_n$, both within the given and the other educational levels 10, 11, 12, 13, 14.

Figure 4:
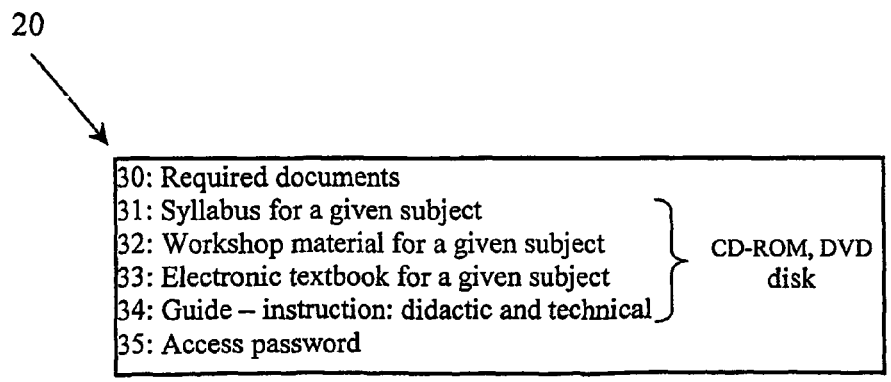
FIG. 4 shows a list of equipment received by a student during the registration for the studies.

To initiate studies by the method according to the invention, an applicant has, in the first order, to make a registration. The registration 20 (FIG. 4) includes submitting to an appropriate department of the university—similarly as in the traditional education mode—suitable documents 30, as for example an application letter, an original and a copy of a high school certificate, photographs, proof of payment for the module and other documents, as required by the university. The payment for the module and the submitting of an application may be effected in any way, including the electronic one. During the registration a candidate for studies selects a faculty and at least one study module. All the information concerning faculties and activity terms are available on the university's web site, being an integral part of the educational platform 3. In the web site is included information on lecturers, conducting a given module, their e-mail addresses, information on consultations, discussion group addresses and other necessary information.

Within the registration 20 a student receives a syllabus 31, a workshop material to be activated during the interactive electronic workshops, a multi-media electronic textbook, a starter package 34 and an access password 35 for the educational platform 3. The syllabus 31 contains information relating to the material the student should prepare before given workshop activities, to better understand the material presented during the interactive electronic workshops 21, as well as information on complementary literature. The syllabus 31 is preferably contained in an electronic data carrier, such as for example a CD-ROM or DVD disk and/or placed in the university's web site.

Workshop material 32 being activated during the interactive electronic workshops 21, consists of a series of following sequences: presentation of the problem, description, explanation, illustration, actual examples from economic reality, indication of application possibilities, checking of student's understanding of the material and finally a recommendation for applications. Besides, the workshop material 32 presented acts upon several senses (eyesight, hearing) and various perception forms (for example presentation of text, static and moving pictures). Application of such solutions, advantageously visual (for example graphic animation, visualization of a run of thoughts), which will facilitate the student's understanding of successive issues, is also of importance. In the workshop material contained in a CD-ROM or DVD disk is preferably included a majority of the educational material being presented during the electronic workshops 21, and activated by the lecturer, in particular the high-volume educational material. Due to the above, high data transmission speed is not required, since during the workshops only a low-volume part of the educational material is transmitted and attached to the high-volume educational material. Should a high-speed data transmission network exist, it is, of course, possible to transmit a larger part or totality of the workshop material.

Multi-media electronic textbook 33 is a substitute of a traditional textbook or reference textbook, therefore it contains a material relating to the issues of a given subject (module). It is intended for students study, giving a possibility of mastering the material within an independent effort. Basing upon the material included in the multi-media textbook 33 and recommended complementary literature, the student, according to the recommendations of the syllabus 31, prepares for the workshop sessions. The electronic textbook 33 is included in the CD-ROM or DVD disk. The electronic textbook 33 contains data in any format, including text, graphic, audio and video as well as useful Internet addresses for complementary materials. The electronic textbook 33 may be enabled both in off-line as in on-line mode (during the workshop sessions). In the first case, the electronic textbook 33 may be opened by means of an executory program included in the CD-ROM disk at any time, without a necessity of connection to the educational platform 3 through Internet. After opening of the electronic textbook 33 at first a front-page screen is displayed and next a contents list. Upon enabling of any title in the contents list, sub-titles become displayed besides the contents list. Browsing in the textbook is effected using a keyboard and/or a mouse, or using buttons displayed in a toolbar, such as transfer to previous and next page, return to previously open page, transfers to the contents list and to the definition index, which considerably accelerates the educational process. Available are also options of reader enabling and disabling, printing, zooming and other standard program service functions, such as help and product information as well as program closing.

Starter package 34, included advantageously in a CD-ROM disk, contains a didactic guide and a technical instruction, instruction movie and necessary software for opening formats of files contained in the workshop material 32. Opening the starter package 34 causes a check-up of required software, already installed, and in case of found deficiency, an automatic installation is effected. The starter package 34 may also include other necessary data or information.

The above described components, i.e. the syllabus 31, the workshop material 32, the electronic textbook 33 and the starter package 34 may be contained in separate disks, destined particularly for the individuals studying in other way than the "e-earning". For the "e-learning" students, all of them are preferably included in a single CD-ROM, which considerably facilitates and simplifies the learning and the operation of the educational material and reduces production costs of large quantities of CD-ROM disks or other electronic data carriers.

Access password 35 serves for the student's login to the educational platform 3 of the educational system during the electronic workshop sessions. The access password 35 remains unchanged during the whole study period for these modules, to which the student registered himself. Depending if the student participates in a given session or not, the access password 35 is active or not, respectively.

Following the registration 20, a student should start individual learning, utilizing all the materials 31, 32, 33, 34 received as well as Internet with which he may connect using the Internet addresses, in order to obtain complementary material (this relates to the links being an Internet bibliography). For a study of each module, a student should devote sufficient time for individual learning, so called independent study, amounting in regard to the module's difficulty between 100 and 200 hours. Although the distance learning system is very flexible, from a student is nevertheless required orderliness and self-discipline.

Following the registration 20, but prior to start of the session of electronic workshops 21, a student has an opportunity to check his computer hardware to obtain information, if it complies with requirements concerning communication with the educational platform 3. For this purpose serves a specially prepared test software, included in the university's web site, being an integral part of the educational platform 3. After start-up of the test software, using the access password, a verification of the software and hardware used by the student is effected. Any lack in equipment or software is signaled by a suitable announcement, while, in the latter case, there is a possibility of automatic installation of the missing elements by downloading from the web site.

Figure 5:
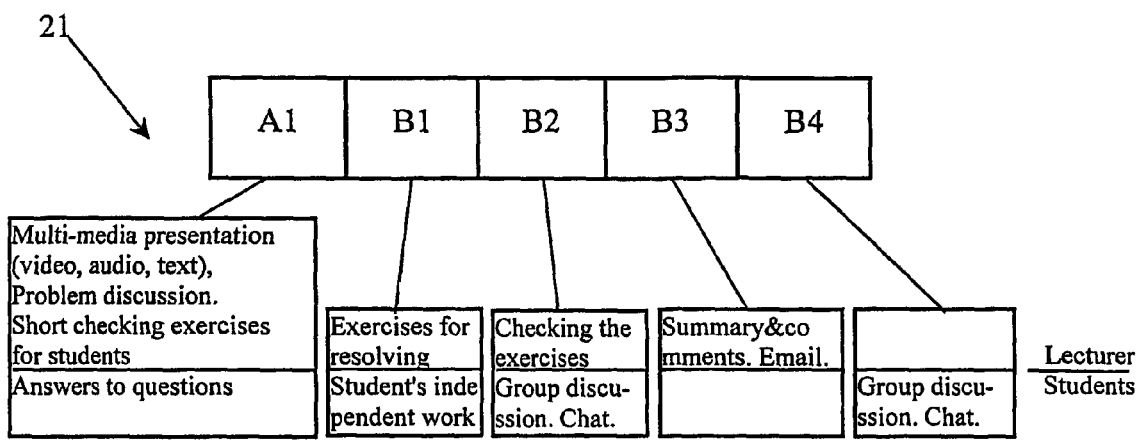
FIG. 5 shows a block diagram of the electronic workshop architecture.

Next stage of the distance education method according to the invention are the interactive electronic workshops 21 illustrated in FIG. 5, taking place completely on-line. In a suitable time, prior to the start of the electronic workshops 21, counting several or even several dozens of minutes, a student 1 should login to the educational platform 3, using the access password 35 allocated to him. After the login to the educational platform 3, each student has an access to a list of modules M to which he is enrolled. To participate in on-line classes the student selects from the list that module in which he intends to participate this time.

Each module $M_1, M_2, \ldots M_n$ consists of several electronic workshops 21, the number of which ranges from a few to several dozens, for example nine, taking place in consecutive weeks or being otherwise spread in the time of a given study session. Duration of one session of the electronic workshops 21 ranges from 1 to 5 hours, for example 2 or 3. During the electronic workshops 21 a CD-ROM disk, containing the workshop material 32 and, preferably, the electronic textbook 33 should be located in the drive of the student's computer, to enable free access to it. The purpose of the electronic workshops 21 is in creating communication between the lecturers and the students, similarly as during classes (lectures, seminars, exercises) in the traditional education.

Each session of the electronic workshops 21 (FIG. 5) includes two principal parts: the presentation-workshop part A1 and the individual students' work parts B1, B2, B3, B4. For each of the parts A1, B1, B2, B3, B4 an appropriate time is allocated, for example, in a two-hour workshop session for the parts A1, B1, B2, B3, B4 30, 30, 20, 10 and 30 minutes, respectively, are allocated. The number of parts, into which is divided each session of the electronic workshops 21 as well as the duration of each part may, of course, be suitably changed in accordance to the volume of material in a given module, degree of its advancement and difficulty to assimilate.

Figure 6:
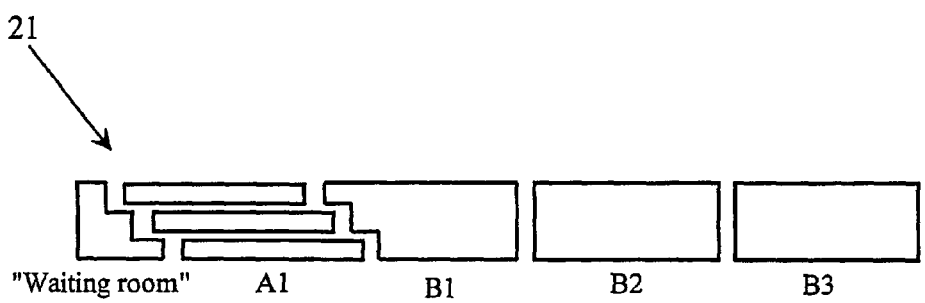
FIG. 6 illustrates a concept of "waiting room" for students waiting for the electronic workshops.
Figure 7:
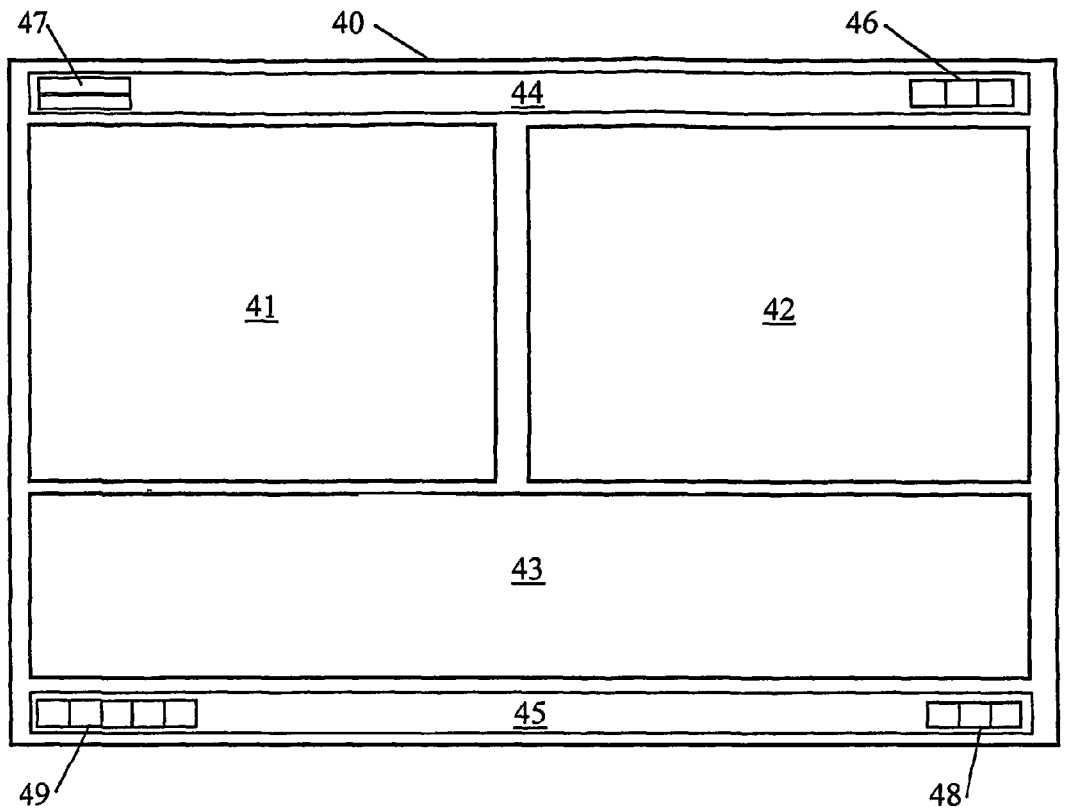
FIG. 7 illustrates a representative user interface during an interactive education according to the invention.

If before the start of electronic workshops 21 a student will not manage to login to the educational platform 3, he/she will be directed to a "waiting room" and automatically included to the workshops at the nearest opportunity, for example after an end of one and before a beginning of another part of the workshops. An example of practical implementation of the "waiting room" (FIG. 6) consists of parallel conducting from the university's transmission center of a few, advantageously 2 or 3 similar workshops with a delay of a few, for example 5, minutes between them. If the student's delay is small, not exceeding one transmission delay he/she starts participation in the workshops in the session starting next. If the delay is significant, from the "waiting room" the student is transferred to the next part of the classes. Such a shifted transmission of a few sessions of the electronic workshop 21 may relate to all their parts but most favorably it should concern the first part A1.

In each part A1, B1, B2, B3, B4 of the electronic workshops 21 (FIG. 5), both the lecturer and the students have defined tasks to perform. In the part A1, the lecturer presents more important issues and problems, which he then discusses and explains, he presents as well more important definitions, illustrations and practical examples. One of the elements of the lecturer's presentation of successive issues is in providing of a list of Internet addresses relating to the problem. During the presentation, to the address list, successive addresses are added, which makes the list grow with the presentation. It can be saved by students for later opening. In the part A1 the lecturer asks the students short testing questions in a form of tests, which the students answer immediately. These questions have a purpose of running evaluation of the lecture's reception by the students, as well as keeping up their concentration, activeness and interest. The lecturer may in real time review the number of individuals who answer the questions, the rate of correct answers and observe which issues were not correctly understood by the students, or raise doubts and which are too easy for the group. This enables the lecturer to presents, if necessary, the subject in another, more comprehensive way. The students' task in the part A1 of the electronic workshops 21 is in attentively following the material presented by the lecturer and in answering the test questions asked.

In the part B1 the lecturer transmits to the students exercises for individual resolving, both obligatory as facultative, in the form of files, containing various types of exercises. These may be problems, analytic and quantitative exercises, text files, calculation sheets or other, depending on the kind of subject and exercise. During the resolving of the exercises, each student may ask the lecturer questions in the form of chat, but cannot communicate with other students (to not disturb their activities), besides that, he/she may use the electronic textbook 33, enabled from the level of the educational platform 3. In the end of the part B1, the students send the lecturer, by electronic mail, files with resolved exercises, at least those obligatory. Solutions of the facultative problems may be transmitted later, within the electronic consultations described below.

In the part B2 the lecturer checks the exercise solutions sent to him while the students using chat discuss between them, compare the solutions and exchange views and remarks. In the part B2 the lecturer does not participate in the chat discussion, although he oversees its course.

In the next part B3 of the electronic workshops 21, the lecturer sums up the exercise solutions, discusses the most important problems and sends by electronic mail correct solutions to all the students inscribed for a given module, also to these which did not participate in the workshops.

The last part B4 of the electronic workshops 21 is intended solely for disposal of the students, which may continue their discussion upon the issues touched within the workshops. In this part of the workshops the lecturer does not participately active, but performs the function of an observer.

During the electronic workshops 21, of considerable importance is the educational platform's 3 interface 40, designed specially for educational purposes. The user interface 40 has been so designed, as to be user friendly. It includes three principal windows, i.e. an information window 41 (left window), an action window 42 (right window), and a dialogue window 43 (lower window) as well as upper and lower toolbars 44 and 45. It should be noted that the given definitions of the positions of windows and toolbars, like left, right; upper and lower are used only to simplify the description, since each of them may be relocated, reduced, enlarged or closed.

The information window 41 serves to present various auxiliary information, like an index of the notions of which definitions are described in the action window 42, questions, clues for answering given questions as well as mathematical formulas, additional information relating to the examples discussed, text of exercises, definitions and similar information.

In the action window 42 is presented an educational material connected with the issues discussed by the lecturer. Various forms of presentations are utilized without limitations, for example: video, 3-D animations, 2-D illustrations, layouts, charts, texts and calculations, new information and other suitable data. Video in the action window 42 includes a video presentation with a lecturer or other individual discussing an issue, pre-recorded or as a real-time camera take, video film with an illustrating example, interviews (for example with an expert), documentary films as well as video presenting the use of computer programs (appearance of screen during successive actions), for example of a calculation sheet or a database. Such a differentiated presentation of a material considerably facilitates students' assimilation of a knowledge.

The dialogue window 43 enables fast access to the syllabus 31 of the electronic workshops 21, to the index of notions, definitions, formulas, calculator, electronic textbook 33 as well as to the chat and electronic mail, and to the virtual campus.

Upper toolbar 44 of the interface 40 includes standard buttons 46 for closing, reducing, and pulling-down, as well function buttons, for example to start and close a session. Lower toolbar 45 includes communication buttons 48, for example a chat, an e-mail or a forum, where all the educational platform users may exchange views and remarks, as well as relay buttons 49, including relays to the electronic textbook 33, notion index, syllabus 31, Internet addresses and calculator. All the above tools are an integral part of educational platform interface 40. The tools are active or not, during the electronic workshops 21, depending which part A1, B1, B2, B3, B4 of the workshops is executed. For example, the relay to the electronic textbook 33 is active in the part B1 as an aid for exercise resolving and in the parts B2 and B4 during the group discussion. The chat button remains active in the parts B2 and B4 of the electronic workshops 21, while the e-mail button in the part B3.

Lecturer's interface is similar to the students' interface 40 with that difference, however, that it does include additional windows, presenting for example information on students participating in the given electronic workshops 21, a number of students which answered a question asked, a number of correct answers and similar information.

For the students which did not participate "live" in the electronic workshops, as well as for those, which would like to repeat the classes, an archive is provided, including only the part A1 of the electronic workshops 21, since the correct answers of the exercises have been distributed by e-mail to all the students registered for the module. Participation with archived electronic workshops is similar as in the "live" workshops, via the educational platform 3 and Internet, using the access password 35. The archived electronic workshop option is active to the moment of submitting the test work 23 in a given workshop session. The access password 35 to the educational platform 3 remains also active, for each module, for a definite time, for example 2 weeks prior to each examination 25. This allow students to have an access to all electronic workshops having been conducted, in order to repeat the material previously followed.

Figure 8:
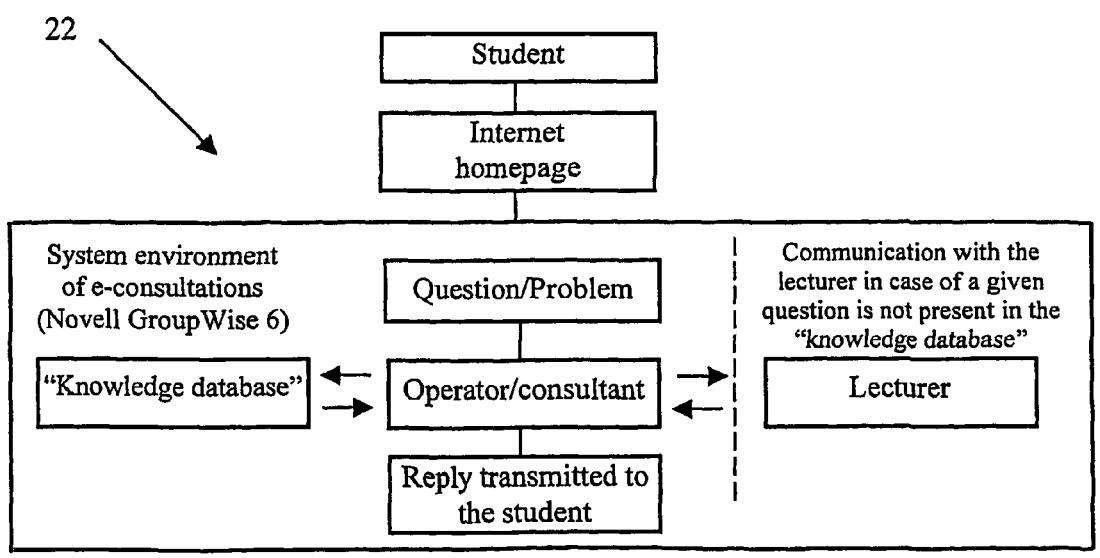
FIG. 8 shows a scheme of electronic consultations implemented within the method of distance learning.

After completing a session of electronic workshops 21 (FIG. 3) the students have a possibility to use the electronic consultations 22 (called "e-consultations"), which may be complemented by traditional consultations, during the lecturer's duty. The e-consultations 22 (shown in the FIG. 8) take place during the whole year of studies and are effected by means of e-mail or group discussions, after the student/s login to a-mail system, being an integral part of the university's web site, hence of the educational platform 3. The e-mail may operate in any mail system, for example in the Novell Group-Wise 6. By means of the electronic consultations 22, students may ask for the assistance of any lecturer in the university, not just of the one with whom they had earlier classes. Within the electronic consultations 22 the students may ask any questions, relating to defining the issues of a given module, while the question should be concise, clear and understandably formulated.

A question posed by a student is answered by an operator/consultant (FIG. 8), which in the first order checks if an answer for the question is in the "knowledge database", prepared specially for the needs of "e-consultations" upon the basis of many years' experience gained during traditional consultations, having taken place in the university. Should the "knowledge database" not contain suitable contents to serve as an answer for the question or should the question require a more detailed reply, the operator/consultant communicates with an appointed lecturer in the discipline, responsible for the participation in the "e-consultations", which prepares answers for the questions received and sends those to the operator/consultant. The operator/consultant transmits the answer received to the student and places it in the "knowledge database". The role of the operator/consultant may be, of course, performed by a lecturer.

The student receives the reply from the operator/consultant within a given time, for example within 48 hours, while in very complicated or exceptional cases—after a longer delay, such as for example 72 hours. The electronic consultations 22 within the discussion groups have for the purpose an exchange of information, questions and resolutions concerning the problems, related to a given module. Access to the discussion group is limited only to those students which are enrolled for the module, while for each module is provided a separate discussion group. The discussion group activity is run under a supervision of a lecturer of the given module, his obligations include answering questions, particularly those, which remain without a reply by fellow students for a considerable time or are asked most often, as well as to give hints as to the correct way of resolving the exercises, to incite polemics, manage the discussion, to pose new issues for an analysis and also to propose referral to suitable literature or other similar information. Lecturers-consultants may also apply an intermediate level of consultations, for example those conducted by students of higher levels, classifying the questions and replying to the simple ones. In the case of greater number of the electronic consultations' participants, the lecturer may divide them into subgroups.

In every stage of the e-consultations, the students, the lecturer as well as the operator/consultant are informed by the system on the actual status of a question, i.e. does it remain without a reply, or was a reply sent, together with other information, such as hour/date of receiving, opening or cancelling the question/answer. Besides, the system gives a possibility of monitoring the number of students availing of the consultations in a split to individual subjects and specialists, and permits an analysis of the students' scope of interest in the consultations.

Consequent stage of the method of distance learning according to the invention is a test work 23 (FIG. 3), of which the subject and date of returning are available in the university's web site, advantageously already after the first electronic workshops 21 of a given module M. If necessary, a student may collect the test work subject directly at the university. The subject of a test work 23 requires that a student conducts an individual research and analysis of various issues or questions. Ready test work 23 should be returned to the university in a specified time, by means of e-mail and/or fax, regular mail or personal delivery. In the case of sending the test work by e-mail, the student obtains a receipt confirmation immediately. In a predetermined delay from the day of the test work submission, for example within 7-21 days, advantageously—14 days, the student receives from the lecturer an information upon the grading, with a commentary. Should the commentary be insufficient, the student may ask for further explanation by e-mail. Final grading for the test work are also available in the university's web site, preferably separately for each password/identification number, as well as traditionally at the university. In the web site are advantageously included general remarks, concerning the test work solutions by students, particularly most frequent errors and their discussion. Rating system may be arbitrary, advantageous, however, is a point system, for example in a 0-100 scale. Exceeding a minimum threshold of points is equivalent with admitting a student to an exam of a given module M.

Before approaching the examination 25 (FIG. 3), students have an occasion to participate in traditional interactive reviews 24a run in the university or other places, indicated by the university, or in electronic reviews 24, within the reviews a look back together with a lecturer of a material covered within a given module M takes place. The electronic reviews 24, active before each examination 25, permit the students to remind and sort-out the material covered, discussion of the principal issues relating to the given module M as well as clearing up all doubts. Terms of traditional reviews 24a and electronic reviews 24 are available on the university's web site. Electronic reviews take place similarly to the parts A, B2, B4 of the electronic workshops 21 with full participations of the lecturer.

Before entering the examination 25 a student should register himself to an examination list. Only such a student may, however, register which has previously successfully completed the test work on a given module. All the information concerning the examination 25 within a given module M, such as terms and times, is available on the university's web site and—traditionally—at the faculty office. In the case if a student does not register for an exam or does not pass it, he is entitled to one or several additional terms. Registering to an examination list, which is uniform and dynamic, may be effected both in the electronic way, through a connection with the university's web site, entering the password and selecting a date and time for the exam, as—traditionally. The examination list is closed a few days before the examination 25.

The last stage of the distance learning by the method according to the invention within one module M is the examination 25 to which are allowed the students with successfully completed test work 23 and registered to the examination list. The examination list takes place mostly in a traditional way in one of the university's centers. Examination 25 of individual modules are organized at the same time and places for all students of the university, regardless to the study mode chosen by them, since the study programs and examination requirements are identical for all of them. Exams are in essay form, permitting verification of the assimilation level of the whole material in a given module (subject), while the mode of conducting them is determined by regulations. In exceptional, justified cases the exam may be performed electronically, on-line. In the latter case the examination 25a is conducted after previous connecting with the educational platform 3, similarly to the procedure of electronic workshops 21 described above, with such a difference, however, that at least some, and preferably all the accessory tools are disabled, which increases a chance that the student is working without outside assistance. Additional control over the students, writing the examination 25a by electronic means is its application, depending on the case, of such methods and apparatus as to ensure that the student is passing the exam without an assistance, for example by gathering several students in one place under the supervision of the university's envoy, or for instance, inclusion of each student's iris or fingerprint scan into the computer system. The examination 25 and 25a may have any known form, appropriate for the given subject. For examination 25a by electronic means, may be also applied a form of test, while the test should be so designed that its result would give a certainty that the knowledge has been properly assimilated. Multiple choice tests, multilevel tests, self-controlling tests with repeating questions, jump tests and others may be applied.

Examination results are available, similarly as in the case of test works 23 both at the university office and at the university's web site. An access to the examination results is obtained after entering the access password 35 and/or identification number.

The distance learning method according to the invention described above to the limits of one module, is the same for successive modules within all the education levels. Number of modules within one level, duration of electronic workshops, repetitories or consultations may vary but the basic system of education remains the same.

The web site of the university, which is integral part of the educational platform 3, has an extended structure, being used not only for information purposes but also for interactive communication with students. The Internet web site of the university includes among others an electronic library, on-line faculty offices and "e-consultations", accessible after entering the access password 35 and/or identification number.

The electronic library includes in particular: a list of Internet addresses or links useful for a given module, various complementary material like press articles, interviews, examples, additional exercises and problems, exemplary test works and examinations from previous years, advantageously with solutions, selected or all bachelor and master degree dissertations and other elaborations, features from the university's bulletins and the lecturers' publications. The electronic library is dynamic, with a possibility of constant extension with new files.

The invention claimed is:

1. A method of distance learning comprising the steps of:
a) installing an education program on at least one education center server of an educational platform (3) for database management, data transfer and communication amongst the education system users;
b) dividing the education program into several education levels (10, 11, 12, 13, 14), of which each one education level includes at least one module ($M_1, M_2, \ldots M_n$), the at least one module corresponding in its contents to a subject of a traditional education;
c) registering each student (1), within a registration (20), at an education center;
d) providing each registered student (1), within the registration (20), with at least one electronic data carrier in the form of CD or DVD disk for each module (M2, M2, ... Mn), and also with an access password (35) to the educational platform (3), the single CD or DVD disk containing a workshop material (32), a multi-media electronic textbook (33) for independent study, a starter package (34) including a particular didactic guide and a technical instruction as well as software necessary to open the formats of the files contained in the workshop material (32) and the electronic textbook (33), and syllabus (31);
e) establishing at least one interactive on-line session of electronic workshops (21) for each module ($M_1, M_2, \ldots M_n$) within each education level (10, 11, 12, 13, 14) in a predetermined time after registration (20) of the students (1), at least one interactive session being established through the educational platform (3) containing a web site and divided into several independent parts (A1, B1, B2, B3, B4) with the same of different duration, wherein in the part (A1) a presentation to the students (1) of the workshop material (32), a discussion of the issues by the lecturer (4), as well as students' replies to the lecturer's questions take place; in the part (B1)—transmitting by the lecturer (4) of exercises for individual resolution and their resolving by the students; in the part (B2)—checking of the exercise solutions by the lecturer (4) and a discussion between the students by means of remote communication means in the form of at least one tool selected from a group consisting of: electronic mail, voice mail, discussion group, chat and forum; in the part (B3)—summing-up of the issues and exercise solutions by the lecturer (4); and in the part (B4)—a discussion between the students (1) by means of remote communication in the form of at least one tool selected from a group consisting of: electronic mail, voice mail, discussion group, chat and forum;
wherein the students (1), who do not manage to login to the educational platform (3) before the start of the electronic workshops (21) are directed first into a "waiting room" and then automatically including them into the participation in the electronic workshops (21), preferably prior to the commencement of a next part of the workshops, the "waiting room" for delayed students (1) being created by parallel shifted in time running of several similar electronic workshops (21);
and wherein during the interactive electronic workshops (21) for the students (1) is displayed an interface (40) including three main windows: an information window (41) in which all complementary information relating to the material discussed is presented, an action window (42) in which an educational material concerning the issues discussed by the lecturer (4) is presented, and a dialogue window (43) in which the syllabus (31), an index of key notions, definitions and formulas, a calculator, the electronic textbook (33) as well as the chat and the e-mail are presented, and tool bars (44 and 45);
f) activating electronic consultations (22) between the students (1) and the lecturers (4), following the termination of each interactive session of the electronic workshops (22), with use of remote communication means in the form of at least one tool selected from a group consisting of: electronic mail, voice mail, discussion group, chat and forum;

g) providing each student (1), following the termination of a predetermined session, preferably the first session of the electronic workshops (21), with a subject of test work (23) for individual preparation and submission of a test work report to the education center at a predetermined time; and h) conducting a final examination (25, 25a) for each module ($M_1, M_2, \ldots M_n$).

2. A method according to claim 1, wherein several first parts (A1) of electronic workshops (21) are run shifted in time.

3. A method according to claim 1, wherein during the presentation of successive issues by the lecturer (4), the students (1) are provided with a list for saving Internet addresses relating to the issue discussed, to which new addresses are then attached to the list relating to consecutive issues.

4. A method according to claim 1, wherein the electronic consultations (22) are conducted by means of the educational platform (3) with use of the e-mail and a discussion group that comprises the students (1) of a given module, and with a participation of an operator/consultant and/or the lecturers (4).

5. A method according to claim 4, wherein upon receipt of a question by an operator/consultant within the electronic consultations (22) a check is first made in a knowledge database and if it does contain an answer to the question asked, the operator/consultant transmits it to the student, while in the case of a lack of such an answer, the question is directed to a lecturer running a given module, which transmits the answer to the operator/consultant and the latter to the student.

6. A method according to claim 5, wherein the question received by the operator/consultant within the electronic consultations (22) and answer to the question, which were not contained in the knowledge database, are added to the knowledge database.

7. A method according to claim 5, wherein a lecturer (4) is the operator/consultant of the electronic consultations (22).

8. A method according to claim 1, further comprising the step of activating interactive archived electronic workshops, the archived workshops being activated after the termination of the electronic workshops (21), but prior to returning the test work report, preferably solely to the scope of the first part (A1) of the electronic workshops (21).

9. A method according to claim 1, wherein after return of the control work, the lecturer (4) sends to the students (1) in a determined time, advantageously by electronic mail, results of the control work together with a commentary.

10. A method according to claim 1, further comprising a step of activating interactive electronic reviews (24), the reviews being activated prior to the final examination (25, 25a) for each module ($M_1, M_2, \ldots M_n$) with a participation of the lecturer (4), the electronic reviews (24) comprising a repetition of the material covered within the electronic workshops (21) and a group discussion, with use of remote communication means in the form of at least one tool selected from a group consisting of: electronic mail, voice mail, discussion group, chat and forum.

11. A method according to claim 10, wherein the electronic reviews (24) are conducted similarly to the electronic workshops (21).

12. A method according to claim 1, further comprising the step of creating, prior to commencing the examination (25, 25a), a dynamic examination list which is blocked in a predetermined time before the start of the examination (25, 25a).

13. A method according to claim 1, wherein all the information, terms and duration of individual components of the educational process, comprising the interactive electronic workshops (21), the archived workshops, the test works (23), the electronic reviews (24) and the examination (25, 25a), as well as control Work subjects and results, and the examination grading, preferably together with general remarks and descriptions, are included in the web site of the educational platform (3), which is accessible through the use of the access password (35) and the student's identification number.

14. A method according to claim 1, further comprising the step of creating a dynamic electronic library in the web site of the educational platform (3), the library being accessible through the use of the access password (35) and the student's (1) identification number, and including: a list of Internet addresses or links useful for a given module, various complementary material like press articles, interviews, examples, additional exercises and problems, exemplary test works and examinations from previous years, advantageously with solutions, selected or all bachelor and master degree dissertations and other elaborations, features from the university's bulletins and the lecturers' publications.

15. A method according to the claim 1, further comprising the step of checking, prior to the commencement of an electronic workshop session, of a computer's equipment and software necessary for the communication with the educational platform (3) and being in the possession of the students (1), the checking being made by means of test software included in the educational platform's web site, wherein in the case of finding by the test software of a deficiency of necessary software, an automatic installation of such software through the educational platform's web site follows.

16. A method according to claim 1, wherein in the action window (42) are presented videos, 3-D animations, 2-D illustrations, layouts, diagrams, texts and calculations, wherein the videos include at least one presentation selected from the group consisting of: video with a lecturer or other individual discussing an issue, recorded earlier or taken by a camera in real-time, video with an example illustrating an issue, interviews, documentary films as well as video showing utilization of computer programs, in particular of calculation sheets and databases.

17. A method according to claim 1, wherein the tool bars (44 and 45) comprise communication buttons (48) including those for chat, e-mail and forum, and recall buttons (49) including recalls to the electronic textbook (33), to the glossary of terms, the syllabus (31), the Internet addresses and the calculator.

18. A method according to claim 17, wherein in various phases of the electronic workshops (21) individual communication and recall buttons are enabled or disabled.

19. A method according to claim 1, wherein the three main windows are operable to receive independent user interactions with the content of the three main windows, and wherein the three windows are customizable through user interactions.

* * * * *

UNITED STATES PATENT AND TRADEMARK OFFICE
CERTIFICATE OF CORRECTION

| | | |
|---|---|---|
| PATENT NO. | : 8,060,004 B2 | Page 1 of 1 |
| APPLICATION NO. | : 10/525265 | |
| DATED | : November 15, 2011 | |
| INVENTOR(S) | : Jerzy Kalisiak | |

It is certified that error appears in the above-identified patent and that said Letters Patent is hereby corrected as shown below:

In column 18, claim 1, line 27, after "B4) with the same" replace "of" with --or--.

Signed and Sealed this
Thirteenth Day of March, 2012

David J. Kappos
*Director of the United States Patent and Trademark Office*